United States Patent
Jia et al.

(10) Patent No.: US 8,938,388 B2
(45) Date of Patent: Jan. 20, 2015

(54) MAINTAINING AND SUPPLYING SPEECH MODELS

(75) Inventors: Bin Jia, Eastleigh (GB); Ying Liu, Beijing (CN); E. Feng Lu, Beijing (CN); Jia Wu, Beijing (CN); Zhen Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/544,145

(22) Filed: Jul. 9, 2012

(65) Prior Publication Data

US 2013/0030802 A1 Jan. 31, 2013

(30) Foreign Application Priority Data

Jul. 25, 2011 (EP) .................................... 11175174

(51) Int. Cl.
*G10L 15/00* (2013.01)
*G10L 15/06* (2013.01)
G10L 15/20 (2006.01)
G10L 15/22 (2006.01)
G10L 15/30 (2013.01)
G10L 15/07 (2013.01)

(52) U.S. Cl.
CPC .................. *G10L 15/06* (2013.01); *G10L 15/20* (2013.01); *G10L 2015/228* (2013.01); *G10L 15/30* (2013.01); *G10L 15/07* (2013.01)
USPC ........... 704/231; 704/246; 704/247; 704/251; 704/252; 704/255

(58) Field of Classification Search
CPC ..... G10L 15/00; G10L 15/065; G10L 15/063; G10L 15/005; G10L 15/08; G10L 15/10; G10L 15/22; G10L 15/265
USPC .......................... 704/231, 246, 247, 251–255
See application file for complete search history.

(56) References Cited

U.S. PATENT DOCUMENTS

| | | | |
|---|---|---|---|
| 6,785,647 B2 | 8/2004 | Hutchison | |
| 6,941,264 B2 | 9/2005 | Konopka et al. | |
| 7,174,299 B2 | 2/2007 | Fujii et al. | |
| 7,209,880 B1 | 4/2007 | Gajic et al. | |

(Continued)

FOREIGN PATENT DOCUMENTS

| | | |
|---|---|---|
| EP | 1262953 | 12/2002 |
| GB | EP2339576 | 6/2011 |
| JP | 2009020353 | 7/2007 |

OTHER PUBLICATIONS

Aurora Distributed Speech Recognition; [online], [retrieved on Dec. 14, 2010], retrieved from the Internet http://portal.etsi.org/stq/kta/DSR/dsr.asp, 2 pages.

(Continued)

*Primary Examiner* — Leonard Saint Cyr
(74) *Attorney, Agent, or Firm* — Cantor Colburn LLP; Prentiss Johnson

(57) ABSTRACT

Maintaining and supplying a plurality of speech models is provided. A plurality of speech models and metadata for each speech model are stored. A query for a speech model is received from a source. The query includes one or more conditions. The speech model with metadata most closely matching the supplied one or more conditions is determined. The determined speech model is provided to the source. A refined speech model is received from the source, and the refined speech model is stored.

18 Claims, 7 Drawing Sheets

(56) References Cited

U.S. PATENT DOCUMENTS

| | | |
|---|---|---|
| 7,831,426 B2 | 11/2010 | Bennett |
| 8,219,404 B2 * | 7/2012 | Weinberg et al. ............. 704/273 |
| 2003/0036903 A1 | 2/2003 | Konopka et al. |
| 2003/0191636 A1 | 10/2003 | Zhou |
| 2005/0049854 A1 | 3/2005 | Reding et al. |
| 2007/0250311 A1 * | 10/2007 | Shires ........................... 704/226 |
| 2008/0027723 A1 | 1/2008 | Reding et al. |
| 2008/0195387 A1 * | 8/2008 | Zigel et al. ................... 704/236 |
| 2009/0043573 A1 * | 2/2009 | Weinberg et al. ............. 704/223 |
| 2010/0049521 A1 | 2/2010 | Ruback et al. |
| 2012/0022860 A1 | 1/2012 | Lloyd et al. |

OTHER PUBLICATIONS

Application No. GB1207210.4 Corrected Search Report dated Aug. 19, 2012, 2 pages.
Application No. GB1207210.4 Combined Search and Examination Report dated Aug. 20, 2012, 6 pages.

* cited by examiner

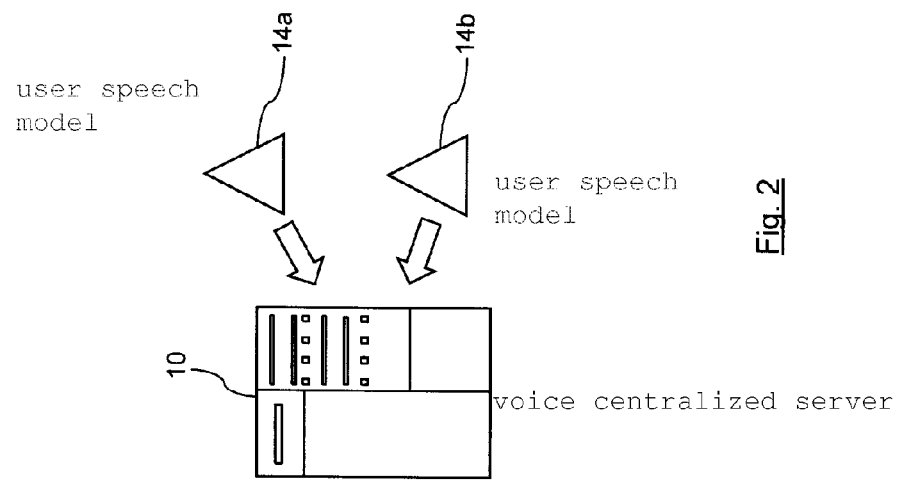
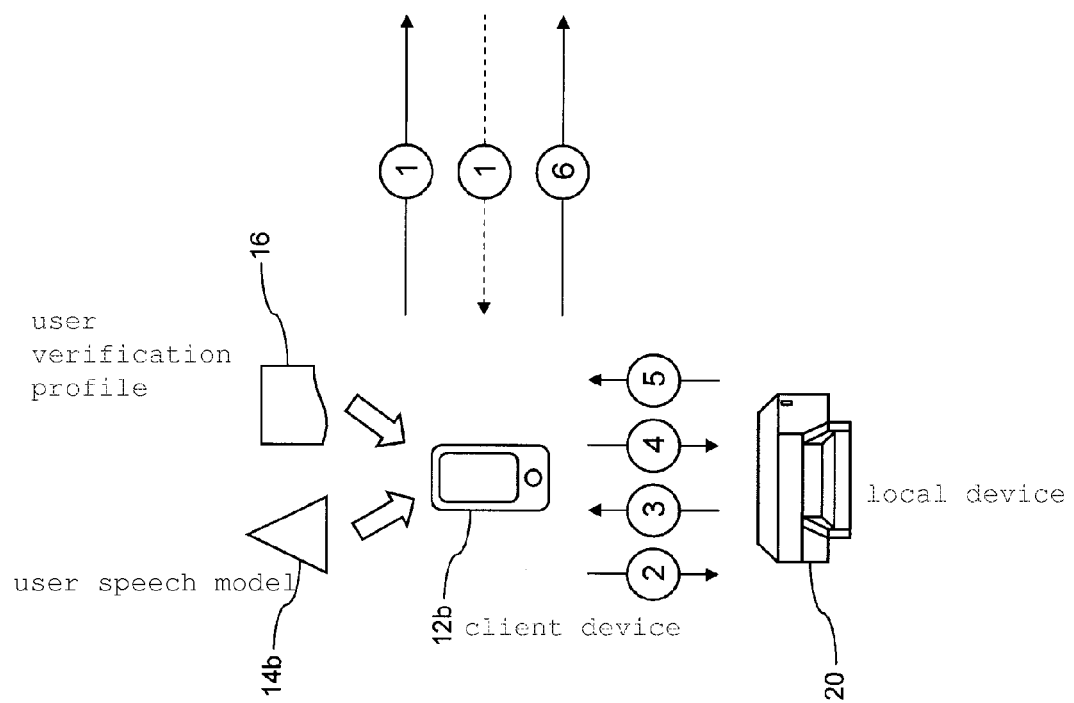
Fig. 2

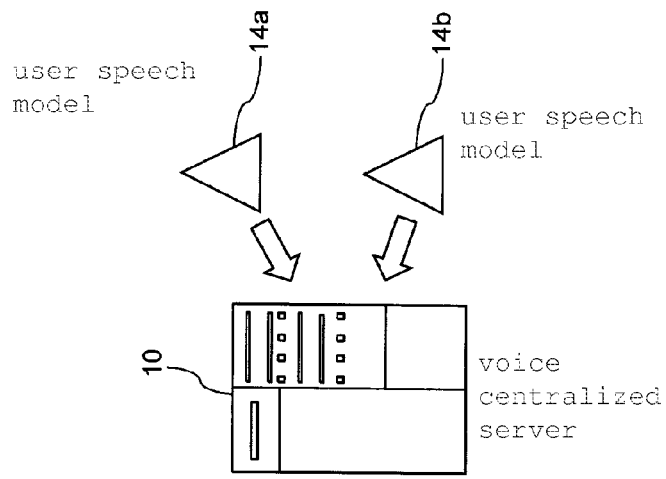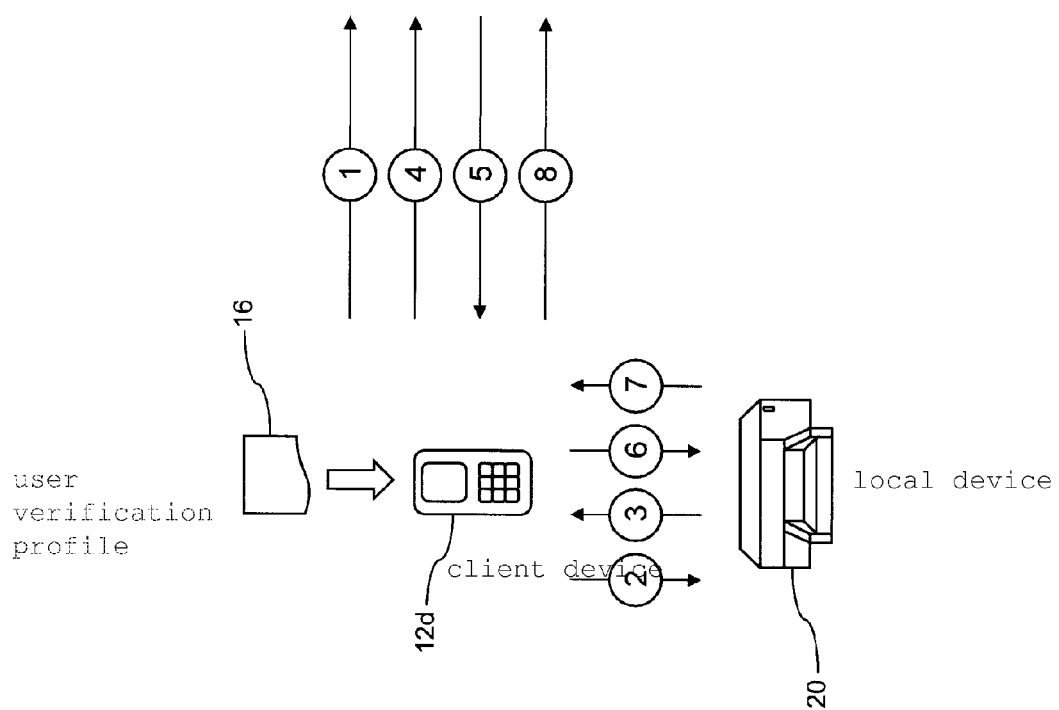

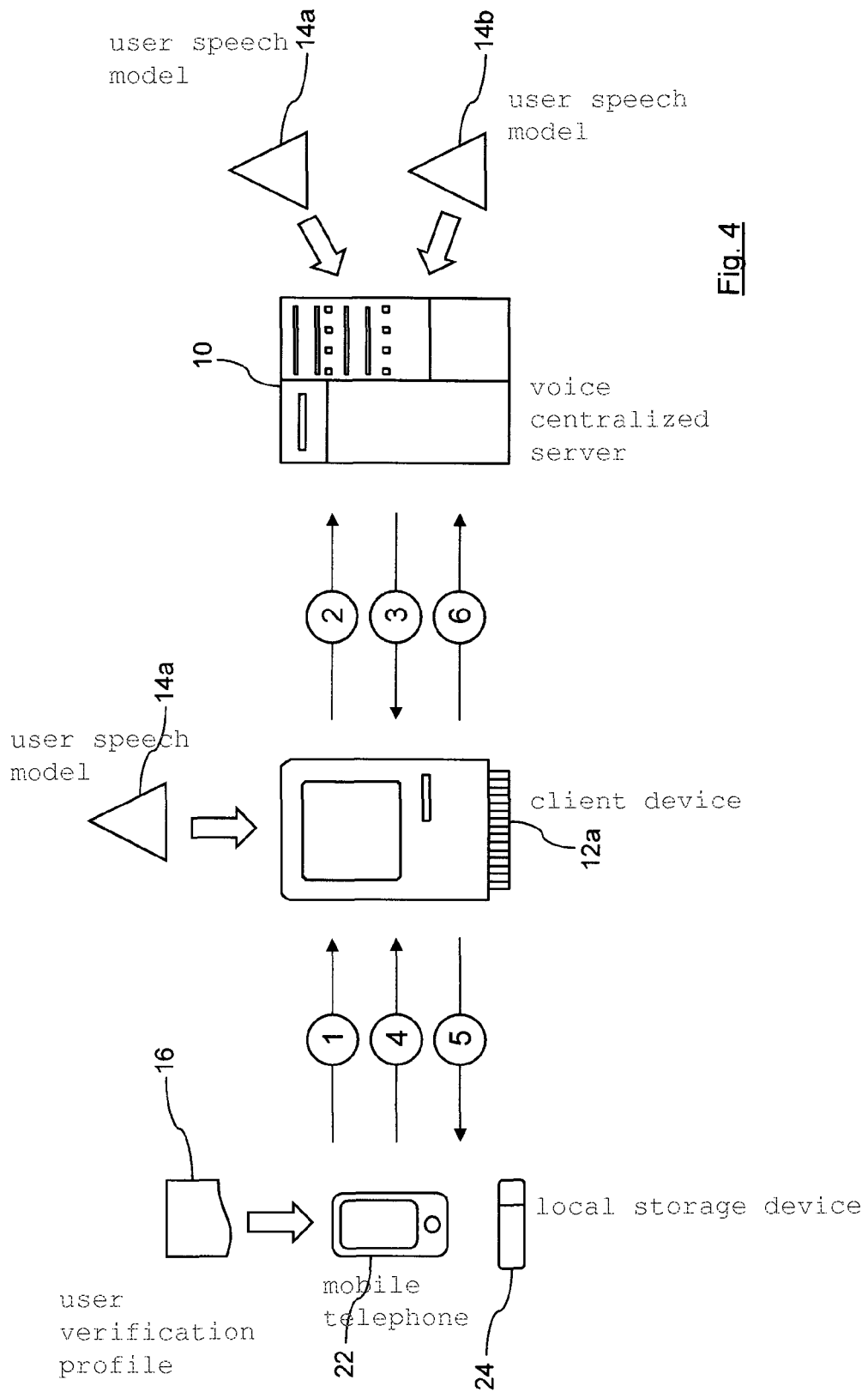

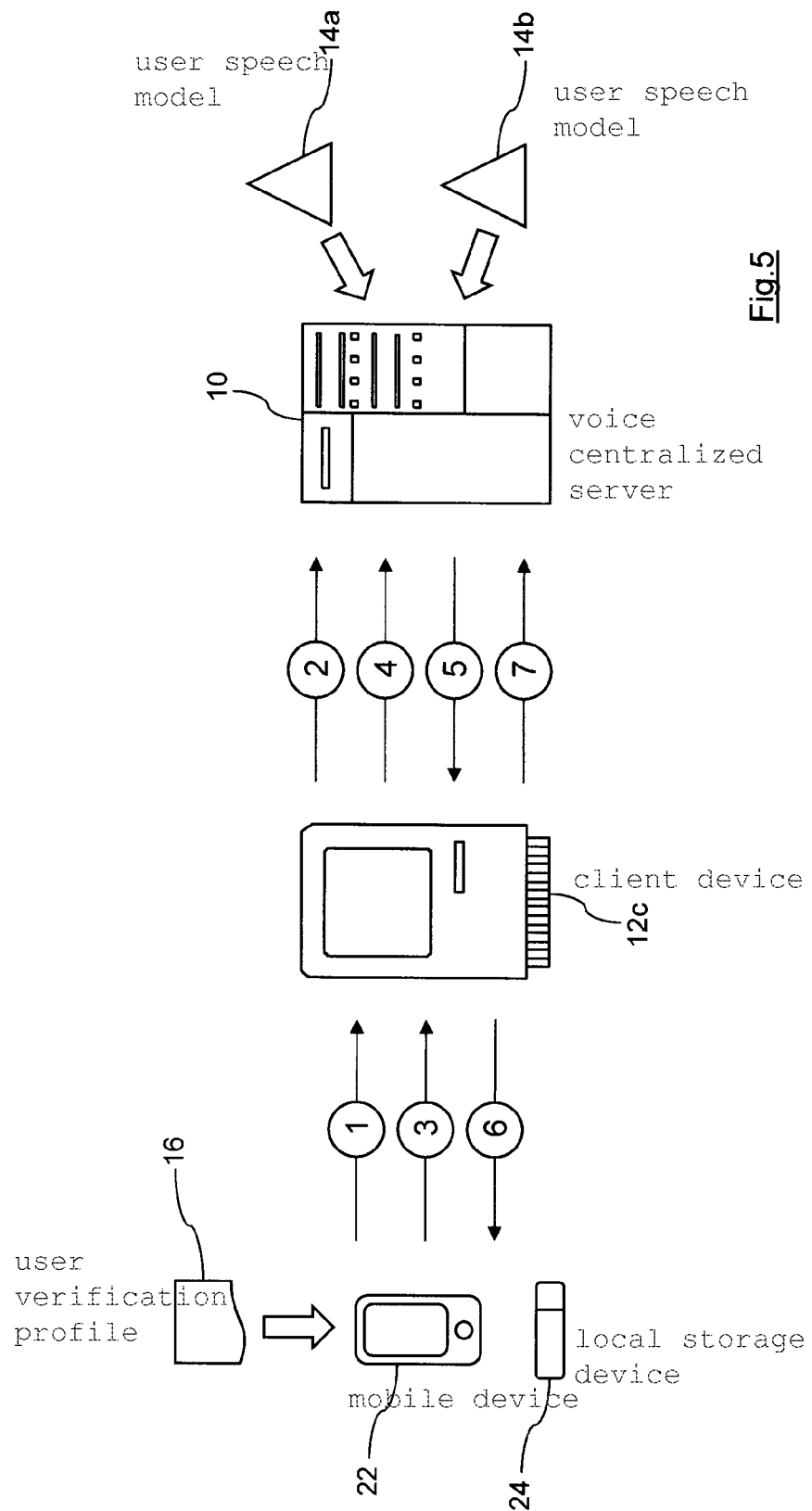

MAINTAINING AND SUPPLYING SPEECH MODELS

PRIORITY

The present application claims priority to European Patent Application No. 11175174.9, filed on Jul. 25, 2011, and all the benefits accruing therefrom under 35 U.S.C. §119, the contents of which in its entirety are herein incorporated by reference.

BACKGROUND

The present invention relates to maintaining and supplying a plurality of speech models. More specifically, the present invention relates to building up a pervasive voice interface.

Speech recognition converts spoken words to text and refers to technology that can recognize speech without being targeted at a single speaker, such as a call system that can recognize arbitrary voices. Speech recognition applications include voice user interfaces such as voice dialing, call routing, appliance control, search, data entry and preparation of structured documents. Speech recognition engines typically require a speech model to recognize speech, which includes two types of files. They typically require an acoustic model, which can be created by taking audio recordings of speech and their transcriptions and compiling them into a statistical representation of the sounds that make up each word. Speech recognition engines also typically require a language model or grammar file. A language model is a file containing probabilities of sequences of words. A grammar file is typically a much smaller file containing sets of predefined combinations of words.

Since the early 1970s, modern speech recognition technology has gradually become fairly mature in some applications from server-based to mobile usage. However, a major hurdle to a pervasive speech recognition application is that there is no systematic and economic methodology to organize the activities of generating, storing, inquiring, and delivering speech recognition models according to the specific conditions and on demand. Some standards and applications exist that attempt to cover broad use situations, such as the distributed speech recognition (DSR) of the European Telecommunications Standards Institute (ETSI). Unfortunately, the standards are based on specific infrastructures without the consideration of universal usage and constrain how speech recognition models are used such that existing approaches can only thrive in specific domains. For example, ETSI DSR can only be used in a telephony area with end points functioning only as speech input/output devices.

SUMMARY

According to exemplary embodiments, a method and computer program product for maintaining and supplying a plurality of speech models are provided, which include storing a plurality of speech models, storing metadata for each stored speech model, and receiving a query for a speech model from a source. The query includes one or more conditions. The speech model with metadata most closely matching the supplied one or more conditions is determined, and the determined speech model is supplied to the source. A refined speech model is received from the source, and the refined speech model is stored.

The system includes one or more storage devices configured to store a plurality of speech models and metadata for each stored speech model. The system also includes a network interface connected to the one or more storage devices, accessible by an external source and configured to receive from a source a query for a speech model. The query includes one or more conditions. The network interface is further configured to determine the speech model with metadata most closely matching the supplied one or more conditions, supply to the source the determined speech model, receive from the source a refined speech model, and store the refined speech model on the one or more storage devices.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

FIG. 2 is a more detailed schematic diagram of the system of FIG. 1 in accordance with an embodiment;

FIG. 3 is a schematic diagram of a system in accordance with a second embodiment;

FIG. 4 is a schematic diagram of a system in accordance with a third embodiment;

FIG. 5 is a schematic diagram of a system in accordance with a fourth embodiment.

DETAILED DESCRIPTION

Figure 1:
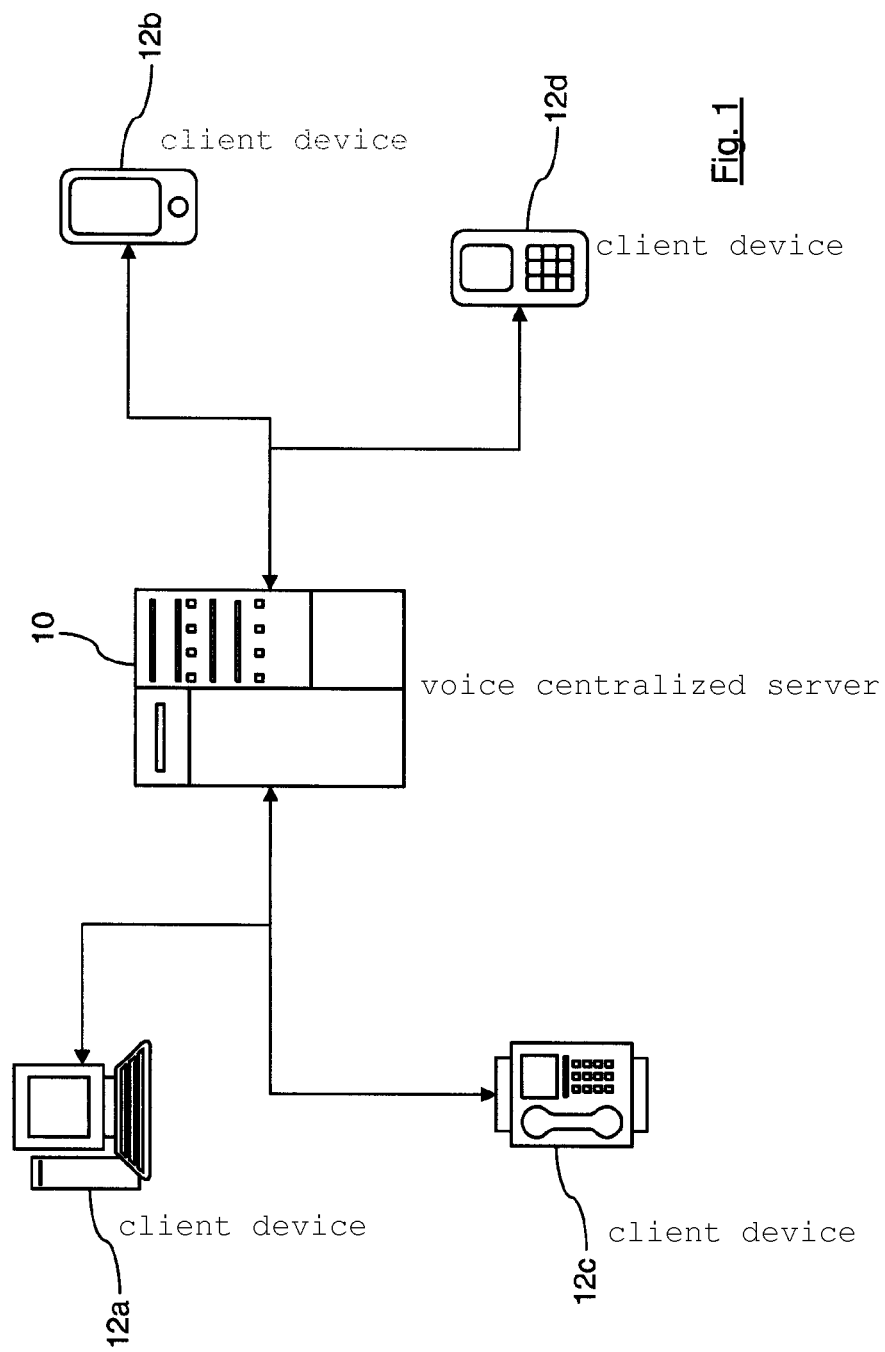
FIG. 1 is a schematic diagram of a system including a server and multiple clients in accordance with an embodiment.

FIG. 1 depicts a system that includes a server 10 and multiple client devices 12. The system provides speech models to the client devices 12 in response to queries received from individual client devices 12. The system provides a network-based technology to enable speech recognition models to be universally processed. In general, the system provides a speech model to a client device 12 on a closest match principle, rather than an exact match, in response to a query for a speech model.

The speech models can be requested via any network using either central servers or distributed end points. Query rules are based on specific conditions and are used to find the closest speech model match. End points decide how and where to get speech models and where to perform the speech recognition based on specific conditions. The end points can refine the speech models and store them via the network with a description of any specific conditions.

In speech recognition processing, a substantial computational effort is performed based on a speech model definition in order to generate the most accurate text output for the original speech input. In an embodiment, there are three types of end points in the voice network of FIG. 1. First, the voice centralized server 10 may include numerous individual computers and can store a large number of different speech models for different end users, including general models and customized models. The server 10 also is sized to handle a large number of concurrent speech recognition requests.

Second, public end points, such as devices 12a and 12c, are end points placed in a public/shared area which use speaker-independent voice applications. Devices 12a and 12c are also referred to as client devices 12a and 12c, end point devices 12a and 12c, and public end point devices 12a and 12c. Multiple users can use their voices to control this type of end point. For example, an automated teller machine (ATM), which may include a voice application for accessing user accounts, could be used by anyone (speaker-independent). Since such end points are for public/shared usage, it is not convenient to store and apply customized speech models for every user and usually privacy is not a problem for public/ shared end points. There are two subtypes of public end points, an end point with full voice processing capability and an end point with limited voice processing capability. An end point with full voice processing capability can use full speech recognition ability and may execute the speech recognition on the end point device itself. An end point with limited voice processing capability can, for example, only collect speech input and communicate with the centralized server 10 to get a processing result.

Third, there are private end points, such as the devices 12b and 12d. Devices 12b and 12d are also referred to as client devices 12b and 12d, end point devices 12b and 12d, and private end point devices 12b and 12d. A private end point has a network connection that can only be accessed by a specific end user, for example, a cell (mobile) phone. A private end point can store speech models for a specific user. However, if the end point needs to achieve some public voice application, for example a banking application, the device must communicate with a public end point for the application data. Similar to public end points, according to the end point computation ability, two sub-types of private end points are possible. These are an end point with voice processing capability and an end point with a limited voice processing capability. An end point with voice processing capability has full speech recognition ability and can execute the speech recognition on the end point device itself and store private speech model data for the specific user. An end point with a limited voice processing capability has only a limited speech recognition ability and can store private speech model data but will send the collected speech input and private speech model to the centralized server 10 to get the processing result.

FIG. 2 shows a first working scenario describing the behavior of a private end point device 12b working with the centralized server 10 in accordance with an embodiment. In this scenario the private end point device 12b is provided with full speech recognition ability. The private end point device 12b has full voice processing capability and can execute the speech recognition on the private end point device 12b itself. The private end point device 12b has its own user speech model 14b stored on the device. The private end point device 12b has storage capacity to store the speech model 14b, which may have been previously downloaded. The private end point device 12b searches the network and compares the best matched speech model 14 from the network with the one previously stored in the private end point device 12b. The speech model 14 is used in the present speech recognition. In an embodiment, if network access is not available, then the private end point device 12b uses the pre-stored speech model 14b.

At block 1 (as indicated by the number in a circle on an arrow in the Figures), an end user controls the private end point device 12b to send a user verification profile 16 to logon to the central server 10. The end point device 12b will transmit a query for a speech model 14. The query includes one or more conditions. If no speech model 14 (such as a user specific model 14b) is precisely matched for this end point device 12b, then the central server 10 will return a common user voice model 14a to the end point device 12b. The end point device 12b, which here is shown as a smart phone, has a variety of different functions. The end point device 12b can perform automatic speech recognition (ASR) and is able to collect speech data and environmental data, which is for speech recognition and speech model refinement. The end point device 12b is provided with a display in order to depict available demands and operations of a local device 20 (which here is a printer). The end point device 12b is able to download speech models 14 from the server 10 and upload speech models 14 to the server 10. The end point device 12b is also able to provide short range communication between the end point device 12b and the local device 20.

In this embodiment, the user is assumed to be using the private end point device 12b to control the local device 20. At block 2, the private end point device 12b connects to the local device 20. At block 3, the local device 20 returns a menu list to the end point device 12b in text. At block 4, the end user speaks an operation command and the private end point device 12b sends the ASR result to the local device 20. At block 5, the local device 20 performs the required actions that correspond to the end user's verbal input. Finally, at block 6, the private end point device 12b uploads any collected data and a refined speech model to the central server 10.

FIG. 3 illustrates a scenario implemented by an embodiment that uses a private end point device 12d with limited speech recognition ability, such as a legacy mobile phone. In this scenario, the private end point device 12d has limited voice processing capability such that the end point device 12d can only collect speech input but cannot recognize the speech. As in the previous embodiment, the user is assumed to be using the private end point device 12d to control a local device 20. At block 1, the end user controls the private end point device 12d to send a user verification profile 16 to logon to the central server 10. At block 2, the private end point device 12d connects to the local device 20. The local device 20, in block 3, returns a menu list to the end point device 12d in text format.

At block 4, the end user speaks an operation command and the private end point device 12d collects the speech input and sends it to the central server 10 for recognition. At block 5, the central server 10 returns the ASR result to the private end point device 12d and at block 6, the private end point device 12d forwards the ASR result to the local device 20. At block 7, the local device 20 performs the required actions that correspond to the end user's verbal input. Finally, at block 8, the private end point device 12d uploads any collected data to the central server 10.

A third embodiment of the system is shown in FIG. 4. FIG. 4 illustrates a scenario using a public end point device 12a, such as an ATM cash point, which has full speech recognition ability. In this scenario, the public end point device 12a has full voice processing capability and can execute speech recognition on the end point device 12a itself and has a common speech model 14a stored thereon. The end user is using a mobile telephone 22 and also possesses a local storage device 24, here a universal serial bus (USB) storage device.

At block 1, the end user sends a verification profile 16 to the public end point 12a using the private mobile phone 22 or USB storage device 24. At block 2, the public end point device 12a forwards the user verification profile 16 to the central server 10 to logon to the central server 10. At block 3, if there is a specific user speech model 14b matched for this user, the central server 10 returns the speech model 14b to the public end point device 12a. Otherwise, the common user voice model 14a on the public end point device 12a will be used.

At block 4, the end user speaks voice command(s) to the public end point 12a. The public end point 12a responds to the user, at block 5. Finally, at block 6, the public end point device 12a uploads any collected data and refined model for this user to the central server 10. In this way, the user can interact with a local device that nevertheless has access to a wide variety of different speech models 14. If the interaction between the user and the public end point device 12a results in the modification of the speech model 14 that is being used, then this refined speech model is uploaded to the server 10, and can be used again in the future, either by this user, or by another user.

FIG. 5 shows a fourth embodiment of the system, which is a scenario using a public end point device 12c with limited speech recognition ability. This could still be an ATM device, but with a reduced functionality. In this scenario, the public end point device 12 has limited voice processing capability and can only collect speech input but cannot recognize the speech. At block 1, the end user sends a user verification profile 16 to the public end point device 12c from the private mobile phone 22 or USB storage device 24. At block 2, the public end point device 12c forwards the user verification profile 16 to the central server 10 to logon to the central server 10. If there is a specific user voice model 14b matched for this user, the central server 10 will use this voice model 14b to recognize the voice of this user. Otherwise, a common user voice model 14a on the central server 10 will be used.

At block 3, the end user speaks to the public end point device 12c. At block 4, the public end point device 12c collects the speech input and forwards the recorded speech to the central server 10. At block 5, the central server 10 returns the ASR result in text to the public end point device 12c. At block 6, the public end point device 12c performs actions in response to the user commands. Finally, at block 7, the public end point device 12c uploads any collected data and refined speech model for this user to the central server 10.

The embodiment shown in FIG. 5, in common with the other embodiments described above, supplies a refined speech model to the server 10 if the speech model 14 used in the interaction between the user and the speech recognition function has been modified. Data may be collected in respect of the refined speech model 14, such as the identity of the user and/or the location of the user and/or the local conditions (background noise etc.) and this can be supplied with the refined speech model 14 back to the server 10. This will result in better matches being made in the future when further queries are made to obtain a speech model for a specific use.

Figure 6:
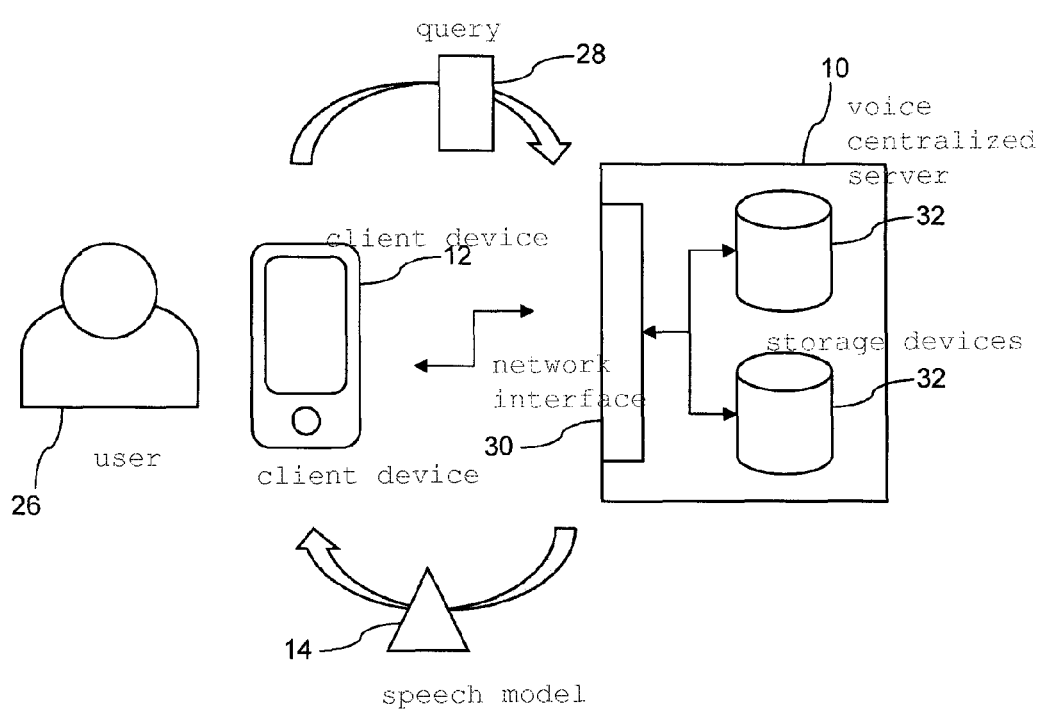
FIGS. 6 and 7 are further schematic diagrams of the system in accordance with embodiments.

FIG. 6 shows a generalized method of maintaining and supplying a plurality of speech models 14. A user 26 has a client device 12, which is in communication with the server 10. In this example, the client device 12 is a computationally powerful smart phone that can perform local speech recognition using an appropriate engine. In order to carry out the speech recognition, the engine requires a speech model 14 and in order to obtain such a speech model 14, the client device 12 sends a query 28 for a speech model 14 to the server 10, the query 28 including one or more conditions. The query 28 is received by a network interface 30 of the server 10.

The server 10 also includes a plurality of storage devices 32 storing a plurality of speech models 14 and also storing metadata for each stored speech model 14. The server 10 determines the speech model 14 with metadata most closely matching the supplied conditions contained within the query 28 and supplies to the client device 12 the speech model 14 that has been selected. As discussed above, the conditions in the query 28 may be simply the identity of the user 26, or may contain more complicated information about the location of the user 26, a current mode of transport of the user and the level of background noise and so on. Whichever speech model 14 best matches the query 28 is returned to the user 26.

Figure 7:
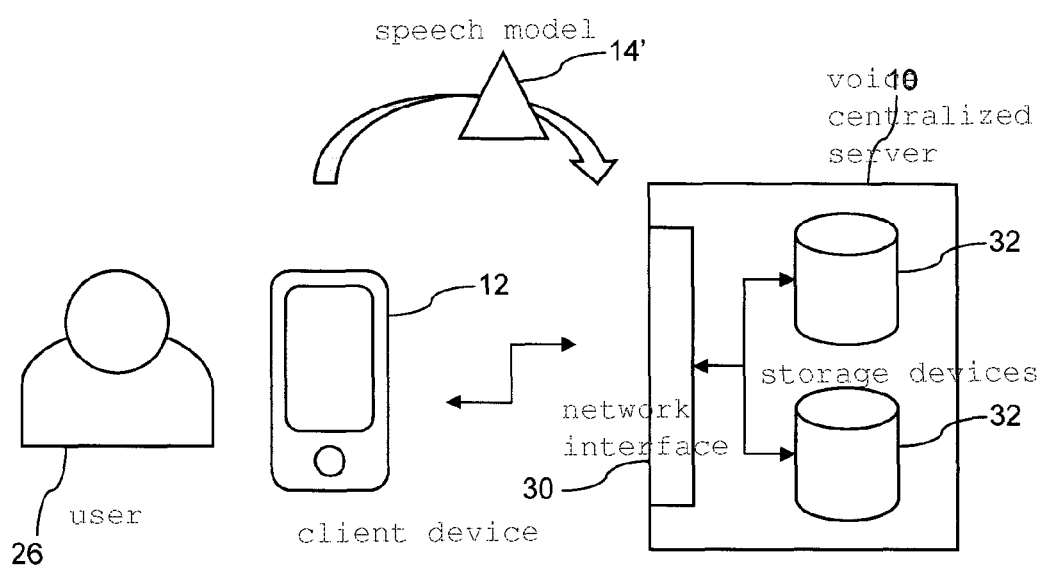

The user 26 will then interact with the voice recognition engine that is using the received speech model 14 in relation to an application that the user 26 is accessing which requires the speech recognition. The nature of the interaction between the user 26 and the voice recognition engine may result in the speech model 14 being adapted, effectively training the speech model 14 in a conventional manner. As shown in FIG. 7, the adapted speech model, referred to as a refined speech model 14', is then transmitted back to the server 10. The network interface 30 receives from the client device 12 the refined speech model 14', and stores the refined speech model 14' in a storage device 32.

According to an embodiment, there is provided a computer program stored on a computer readable medium and loadable into the internal memory of a digital computer, including software code portions, when the program is run on a computer, for performing a method or process of the invention.

Embodiments may include a method and system which store speech models for different situations and provide the best model to a client that provided the search request. The different models can be suitable to different situations. A benefit of such a method and system is that the client can get a model that best fits the current situation without immediate training and all the speech models that have been trained can be reused for different requirements in the future. Furthermore, the speech models can be refined on computationally powerful clients and uploaded to a central server system for storage in the same manner as the speech models trained on the server.

For example, when a speaker carries a mobile device to a new location, the speech recognition model refined by the mobile device in a previous location does not necessarily match well with the new location. In embodiments, the mobile device can automatically upload the current models to servers and download one or more better models from the server to the client. Additionally, the system does not constrain the requesting device to link only to known servers. The device can search on any network to get the best matching speech model from a previously unknown server or device.

In one embodiment, storing the refined speech model includes replacing the determined speech model with the refined speech model. The refined speech model is received back from the client device to the server system and is added to the database of speech models that are maintained by the system. However, the received refined speech model can also replace the original speech model that was supplied to the client device. For example, the refined speech model may be an improvement (through training) of an existing speech model that is specific to a user and/or environment and so the improved speech model can replace the existing speech model for specific metadata of that speech model.

The method and system can be so configured that the query for a speech model includes a condition identifying a user at the source and metadata for the determined speech model includes details of the identified user. Speech models can be created that are specific to individual users. This has a benefit that when the user is in a different location and situation, a speech model that has been trained for that user can be used in the second location. For example, a user may use a mobile telephone to request information about the user's bank account via an application which will use voice recognition software. The bank will create a query for a speech model, which in use can be refined for that user and then saved within the system. Later the user may be in a train station using a dedicated terminal to buy train tickets. The terminal may use recognition software and create a query for a speech model, which can now return the earlier refined speech model that is specific to the user.

The method may further include receiving from the source new metadata for the refined speech model and storing the new metadata for the refined speech model. The method and system can be so arranged that the clients that supply back refined speech models can also supply back new metadata or information that allows new metadata to be created. This can then be stored with the refined speech model in order to ensure that the categorization and storage of speech models is effective in allowing the correct model to be recalled in response to future queries.

The query for a speech model may include a condition identifying an environment at the source, the metadata for the determined speech model does not include details of the identified environment and the storing of the new metadata for the refined speech model includes details of the identified environment. The method and system can be configured so that if a speech model is requested for an environment that is new to the system, and therefore not covered by any existing speech model, then when a refined speech model is ultimately returned by the client device, then this new speech model can be stored with reference to the new environment. For example, a user may be travelling on a bus while accessing an application that uses voice recognition, which will generate a query for a speech model. The system may have no stored speech model that is applicable for such an environment. The speech model supplied may be one that has metadata indicating that it is applicable to an environment such as a moving train. This model will then be refined in use and when returned to the server can be stored with the "bus environment" as the appropriate metadata.

What is claimed is:

1. A method of maintaining and supplying a plurality of speech models comprising:
   storing a plurality of speech models;
   storing metadata for each stored speech model;
   receiving a user verification profile identifying a user at a source to logon the user;
   receiving a query for a speech model from the source, the query comprising one or more conditions that identify the user at the source;
   determining the speech model with metadata most closely matching the supplied one or more conditions that identify the user at the source;
   supplying the determined speech model to the source;
   receiving a refined speech model from the source; and
   storing the refined speech model.

2. The method of claim 1, wherein storing the refined speech model comprises replacing the determined speech model with the refined speech model.

3. The method of claim 1, wherein the metadata for the determined speech model includes details of the identified user.

4. The method of claim 1, further comprising:
   receiving new metadata for the refined speech model from the source; and
   storing the new metadata for the refined speech model.

5. The method of claim 4, wherein the query for the speech model comprises a condition identifying an environment at the source, the metadata for the determined speech model does not include details of the identified environment and the storing of the new metadata for the refined speech model includes details of the identified environment.

6. The method of claim 1, wherein the source is a client device that receives speech from the user, and the method is performed by a server operable to communicate with the client device.

7. A system for maintaining and supplying a plurality of speech models comprising:
   one or more storage devices configured to store a plurality of speech models and metadata for each stored speech model; and
   a network interface connected to the one or more storage devices, accessible by an external source and configured to:
      receive a user verification profile identifying a user at a source to logon the user;
      receive from the source a query for a speech model, the query comprising one or more conditions that identify the user at the source;
      determine the speech model with metadata most closely matching the supplied one or more conditions that identify the user at the source;
      supply to the source the determined speech model;
      receive from the source a refined speech model; and
      store the refined speech model on the one or more storage devices.

8. The system of claim 7, wherein the network interface is configured, when storing the refined speech model on the one or more storage devices, to replace the determined speech model with the refined speech model.

9. The system of claim 7, wherein the metadata for the determined speech model includes details of the identified user.

10. The system of claim 7, wherein the network interface is further configured to receive from the source new metadata for the refined speech model and store the new metadata for the refined speech model on the one or more storage devices.

11. The system of claim 10, wherein the query for the speech model comprises a condition identifying an environment at the source, the metadata for the determined speech model does not include details of the identified environment and the storing of the new metadata for the refined speech model includes details of the identified environment.

12. The system of claim 7, wherein the source is a client device that receives speech from the user, and the system is a server operable to communicate with the client device via the network interface.

13. A computer program product for maintaining and supplying a plurality of speech models, the computer program product comprising:
   a non-transitory computer readable storage medium having computer readable program code embodied therewith, the computer readable program code comprising:
   computer readable program code configured to perform:
      storing a plurality of speech models;
      storing metadata for each stored speech model;
      receiving a user verification profile identifying a user at a source to logon the user;
      receiving a query for a speech model from the source, the query comprising one or more conditions that identify the user at the source;
      determining the speech model with metadata most closely matching the supplied one or more conditions that identify the user at the source;
      supplying the determined speech model to the source;
      receiving a refined speech model from the source; and
      storing the refined speech model.

14. The computer program product of claim 13, wherein storing the refined speech model comprises replacing the determined speech model with the refined speech model.

15. The computer program product of claim 13, wherein the metadata for the determined speech model includes details of the identified user.

16. The computer program product of claim 13, wherein the computer readable program code is configured to perform:
   receiving new metadata for the refined speech model from the source; and
   storing the new metadata for the refined speech model.

17. The computer program product according to claim 16, wherein the query for the speech model comprises a condition identifying an environment at the source, the metadata for the determined speech model does not include details of the identified environment and storing of the new metadata for the refined speech model includes details of the identified environment.

18. The computer program product of claim 13, wherein the source is a client device that receives speech from the user, and the computer readable program code is executable by a server operable to communicate with the client device.

* * * * *